United States Patent

Ogusu et al.

[11] Patent Number: 6,008,942
[45] Date of Patent: Dec. 28, 1999

[54] DIFFRACTIVE OPTICAL ELEMENT AND OPTICAL INSTRUMENT HAVING THE SAME

[75] Inventors: Makoto Ogusu, Utsunomiya; Hiroshi Maehara, Yokohama; Keita Sakai, Utsunomiya, all of Japan

[73] Assignee: Canon Kabushiki Kaisha, Tokyo, Japan

[21] Appl. No.: 08/997,704

[22] Filed: Dec. 23, 1997

[30]     Foreign Application Priority Data

Dec. 24, 1996 [JP] Japan .................................. 8-343468

[51] Int. Cl.⁶ ............................. G02B 5/18; G02B 27/44
[52] U.S. Cl. ......................... 359/571; 359/569; 359/574; 359/575; 359/613
[58] Field of Search ................................ 359/565, 566, 359/569, 571, 574, 575, 742, 613

[56]              References Cited

U.S. PATENT DOCUMENTS

| | | | |
|---|---|---|---|
| 4,697,881 | 10/1987 | Brown | 359/613 |
| 4,800,868 | 1/1989 | Appeldorn et al. | 126/438 |
| 4,874,213 | 10/1989 | Cowan | 359/10 |
| 5,052,033 | 9/1991 | Ikeda et al. | 378/35 |
| 5,151,826 | 9/1992 | Pasco | 359/571 |
| 5,278,028 | 1/1994 | Hadimioglu et al. | 359/565 |
| 5,335,259 | 8/1994 | Hayashida et al. | 378/161 |
| 5,503,950 | 4/1996 | Miyake et al. | 430/5 |
| 5,549,994 | 8/1996 | Watanabe et al. | 430/5 |
| 5,754,340 | 5/1998 | Ushida et al. | 359/566 |
| 5,754,341 | 5/1998 | Takata et al. | 359/566 |

*Primary Examiner*—Jon Henry
*Attorney, Agent, or Firm*—Fitzpatrick, Cella, Harper & Scinto

[57]              ABSTRACT

A diffractive optical element for diffracting non-collimated light includes a base surface and a periodic structure formed on the base surface and having a plurality of diffractive surfaces and a plurality of boundary surfaces. The boundary surfaces are separated into plural zones, and in each zone, the boundary surface is placed substantially parallel to a main portion of a light beam impinging on that zone.

7 Claims, 8 Drawing Sheets

DIFFRACTIVE OPTICAL ELEMENT AND OPTICAL INSTRUMENT HAVING THE SAME

FIELD OF THE INVENTION AND RELATED ART

This invention relates to a diffractive optical element and, more particularly, to a diffractive optical element of a phase type. In another aspect, the invention is concerned with an optical instrument having such a diffractive optical element, and also with an exposure apparatus using the same.

A phase type diffractive optical element is known, and it has a sectional shape such as shown in FIG. 1 or 2. Usually, the periodic structure such as shown in FIG. 1 is called a "blazed shape". On the other hand, the periodic structure shown in FIG. 2 is defined by quantizing the blazed shape of FIG. 1 so that a step-like shape is approximated. In the structure of the diffractive optical element of FIG. 2, the larger the number of steps (levels) of the step structure within one period P is, the closer the shape is to the shape of FIG. 1, and the diffraction efficiency becomes higher.

A phase type diffractive optical element is such a element wherein, due to an optical path difference, a phase difference is produced in light projected thereon, whereby a deflecting function is provided. For example, the element of FIG. 1 serves to deflect input light 51 in a direction as illustrated, and the element of FIG. 2 serves to deflect input light 61 in a direction as illustrated. For the diffractive optical element shown in FIG. 2, the phenomenon may be best understood if the point of emission of light passed through the element is regarded as a second light source wherein light is deflected in a direction in which the light is strengthened due to interference.

For diffractive optical elements, if the period is the same, the input light can be deflected in the same direction. On the other hand, if the period is changed, the input light can be converged or diverged. Here, in FIGS. 1 and 2, if the periodic structure is made continuous, uniformly along a direction perpendicular to the sheet of the drawing, a one-dimensional function can be provided. If the periodic structure is made concentric, a function similar to a lens (refractive optical element) can be provided. In the examples of FIGS. 1 and 2, if the period P is so made that it decreases from the center to the peripheral portion and if a diffractive optical element having a periodic structure of concentric circles with a center at the left-hand side of the drawing is formed, a function of a convex lens can be provided. If a diffractive optical element having a concentric periodic structure with a center at the right-hand side of the drawing is formed, a function of a concave lens can be provided. Further, by changing the period suitably, an aspherical surface effect or a combined effect of a convex lens and concave lens can be provided.

In a diffractive optical element, there occurs dispersion in an opposite direction to a refractive optical element. Thus, by using them in combination, achromatism can be provided even by use of the same glass material.

In a diffractive optical element, as described above, the element is formed with surface relief and, on the basis of a optical path difference, the light incident thereon is deflected. Thus, there is a finite thickness on the diffractive optical surface and, at boundaries in the periodic structure, there are discontinuous side faces (boundary faces such as represented at 54 and 64 in FIGS. 1 and 2). Consequently, in conventional phase type diffractive optical elements, there is a problem that light such as input light 52, 53, 62 or 63 in FIG. 1 or 2 is reflected by the boundary face 54 or 64, which results in flare.

SUMMARY OF THE INVENTION

It is an object of the present invention to provide a diffractive optical element whereby flare light which might be produced at a boundary side face of a periodic structure can be minimized.

In a diffractive optical element according to the present invention, the tilt of a side face of a relief-like periodic structure of a phase type diffractive optical element is determined on the basis of a light intensity distribution, with respect to incidence angle, of light projected on the diffractive optical element.

In a diffractive optical element according to another aspect of the present invention, the tilt of a side face of a relief-like periodic structure of a phase type diffractive optical element changes with the position on the light incidence surface of the diffractive optical element.

It is another object of the present invention to provide an optical instrument or an exposure apparatus having a diffractive optical element such as described above.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

In the periodic structure of conventional phase type diffractive optical elements, the boundary side face is perpendicular to the surface (base surface) on which the diffractive optical element is formed. On the other hand, in a diffractive optical element according to the present invention, a particular note has been paid to the intensity distribution, with respect to incidence angle, of light incident on the element (base surface), and the tilt angle of the boundary face with respect to the base surface may be optimized in accordance with the position on the diffractive optical element, whereby production of flare light can be minimized.

In an embodiment of the present invention, the light receiving surface (light input surface) of the diffractive optical element may be divided into plural regions and, for each divided region, the tilt angle of the boundary side face is set. When the diffractive optical element has a periodic structure with concentric circles, the light input surface may be divided into three regions a1–a3, for example, such as shown in the front view of FIG. 8.

Figure 9:
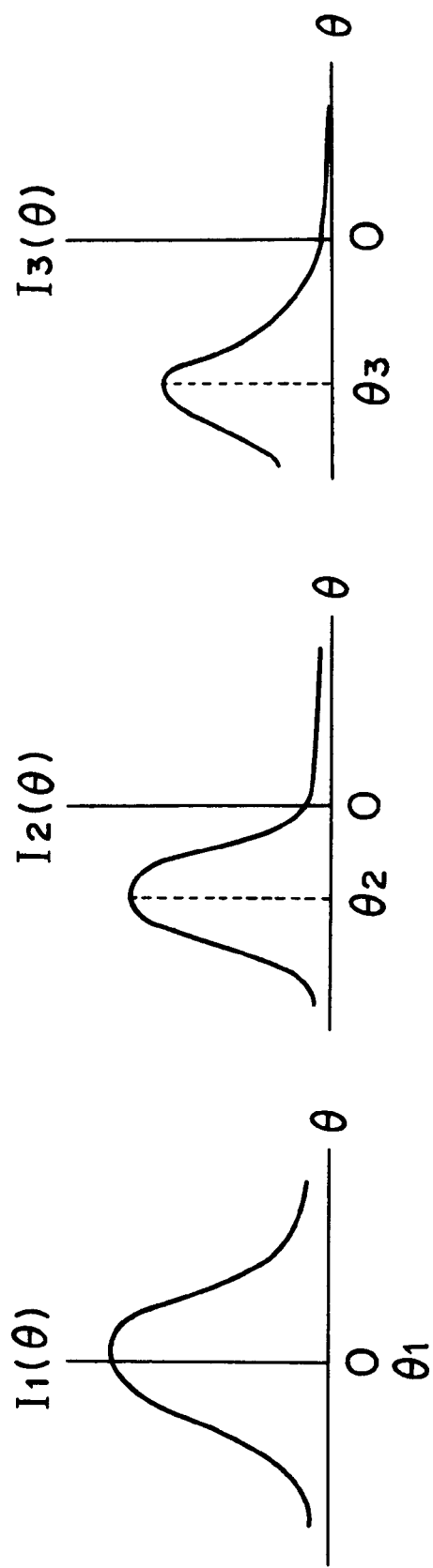
FIGS. 9A–9C are graphs for explaining light intensity distributions on divided regions, with respect to incidence angle.

Here, distributions of light intensities In in the regions a1–a3 with respect to the incidence angle may be such as shown in FIGS. 9A–9C, wherein θ1–θ3 denote incidence angles with which the light intensity at the regions a1–a3 reach peaks. In this example, the angles θ1–θ3 are taken as representative incidence angles for the regions a1–a3.

A diffractive optical element according to the present invention may be arranged so that the boundary side faces of the regions a1–a3 may be parallel to the light rays (representative light rays) which are incident with incidence angles θ1–θ3, respectively, whereby flare which might be produced by reflected light of representative light rays having the highest intensities in the respective regions may be suppressed satisfactorily. In FIGS. 9A–9C, the sign of the incidence angle is assigned so that convergent light is depicted as negative while divergent light is depicted as positive. Also, in the present invention, the incidence angle is defined as an incidence angle with respect to the base surface.

Figure 8:
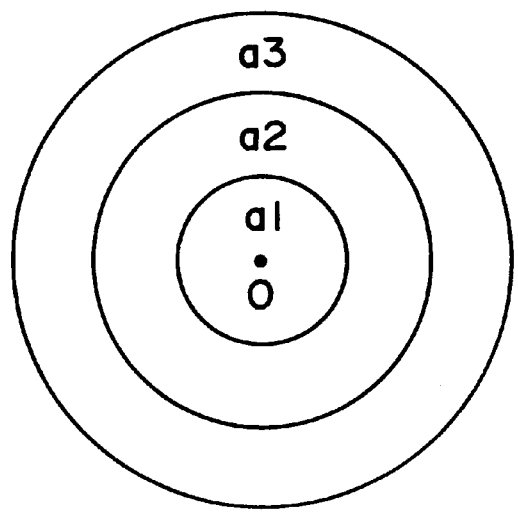
FIG. 8 is a schematic view of an example of divided regions on a light incidence surface of a diffractive optical element.

It is to be noted here that what is illustrated in FIG. 8 is merely an example of division of region in a case wherein the diffractive optical element has a concentric periodic structure. The periodic structure may be one-dimensional, and it does not mean that the region should necessarily be divided as shown in FIG. 8. In other words, the region may be divided suitably so that the tendency of the light intensity distribution with respect to the incidence angle may be approximately even for the divided regions, and it may be set best in accordance with the position where the diffractive optical element of an optical system used is disposed. Of course, in the point of optical performance, a tilt angle being optimum with reference to the boundary side face of the periodic structure of one pitch may preferably be set, if possible.

The representative incidence angle may be an angle at the gravity center of the light intensity distribution, and an incidence angle with which best optical performance of the diffractive optical element is assured may be selected.

Examples of the structure of a boundary side face in relation to various incidence angles, will be described below, with reference to some embodiments.

Embodiment 1

Figure 1:
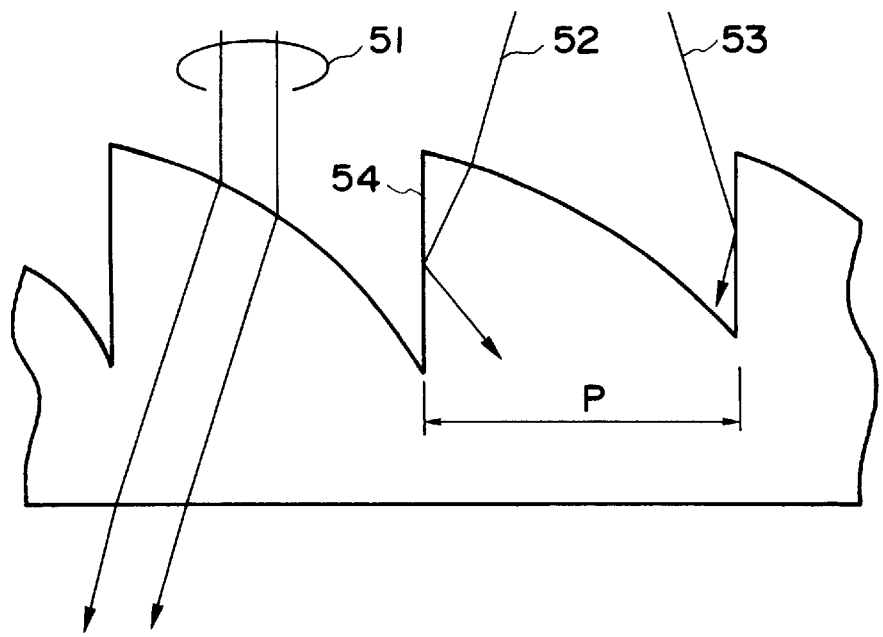
FIG. 1 is an enlarged view of a portion of a diffractive optical element of a known example.
Figure 2:
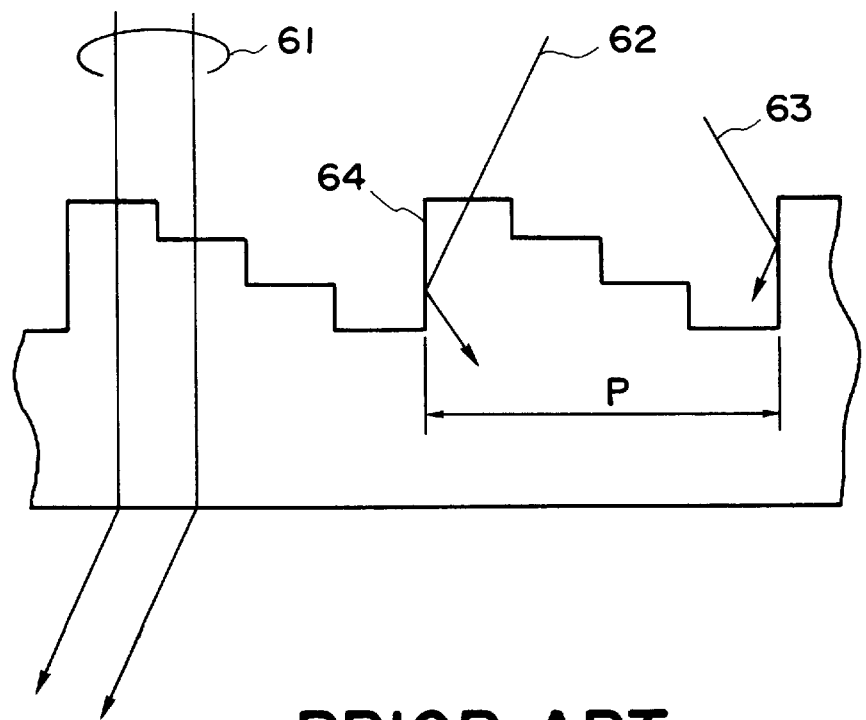
FIG. 2 is an enlarged view of a portion of a diffractive optical element of another example.
Figure 3:
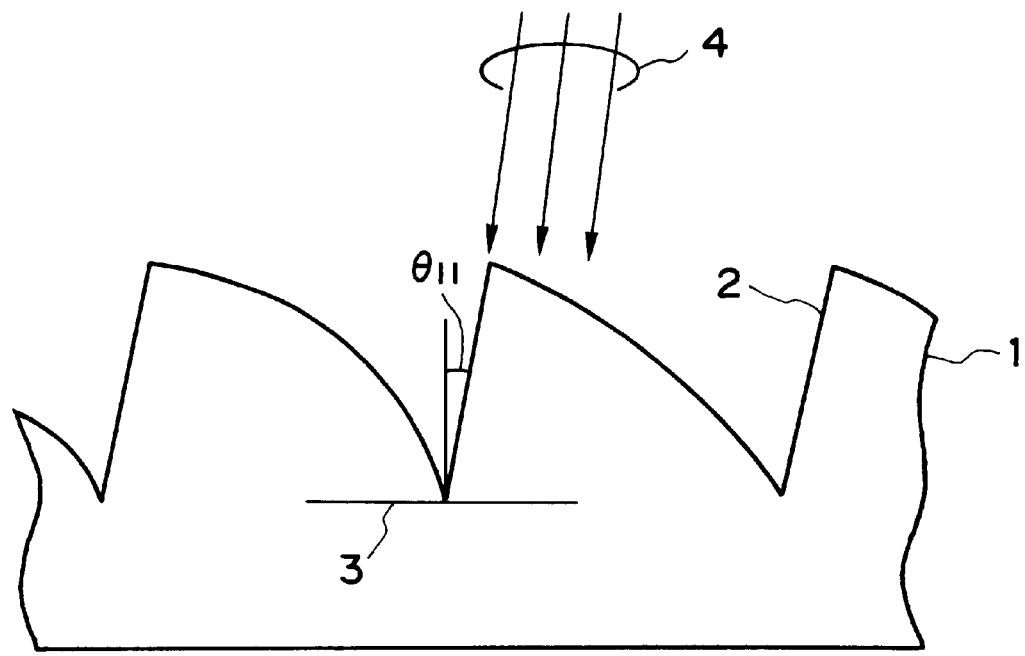
FIG. 3 is an enlarged view of a portion of a diffractive optical element according to a first embodiment of the present invention.

FIG. 3 is an enlarged sectional view of a portion of a blazed type diffractive optical element according to a first embodiment of the present invention. The diffractive optical element of this embodiment provides a function of a convex lens, and it has an optical axis at the left-hand side of the drawing and a periodic structure with concentric circles, the period decreasing toward the periphery. In the drawing, denoted at 1 is a diffractive optical element, and denoted at 2 is a boundary side face. Denoted at 3 is a base surface which provides a reference. Denoted at 4 are representative incidence light rays, being incident with a representative incidence angle θ11. The representative incidence light rays 4 are incident on the diffractive optical element 1 as convergent light.

In this embodiment, the boundary side face 2 is inclined with an angle the same as the representative incidence angle θ11 of the representative incidence light rays 4. With this arrangement, the projection area of the boundary side face 2 to the representative incidence light rays 4 becomes equal to zero, and production of unwanted reflection light at the boundary side face 2 can be suppressed. This effectively prevents flare. Thus, when the diffractive optical element 1 of this embodiment is incorporated into an optical system, the optical performance can be improved significantly.

Embodiment 2

Figure 4:
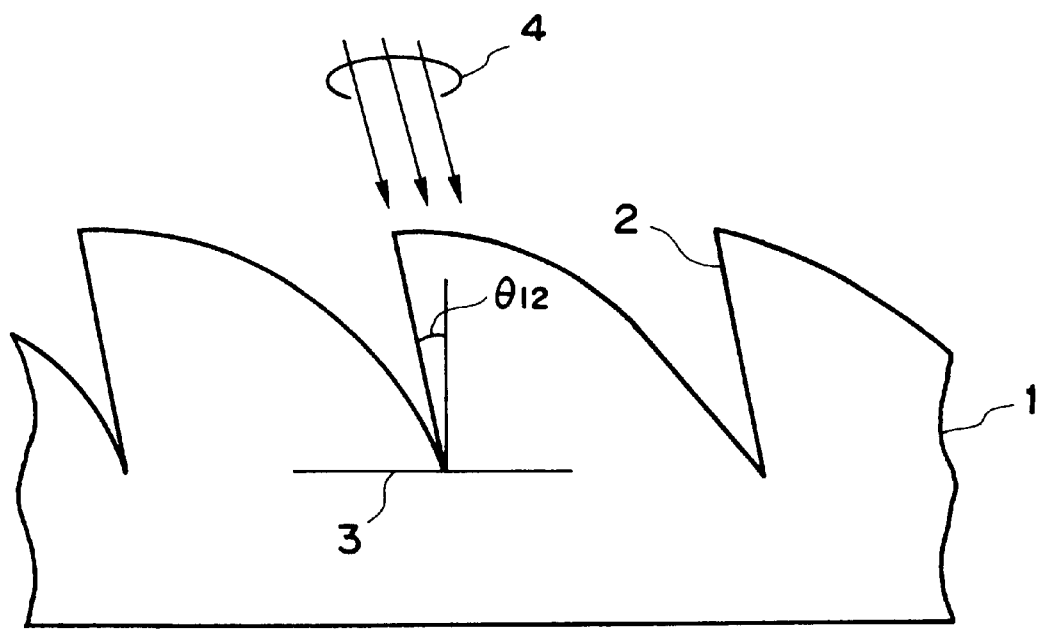
FIG. 4 is an enlarged view of a portion of a diffractive optical element according to a second embodiment of the present invention.

FIG. 4 is an enlarged sectional view of a portion of a blazed type diffractive optical element, like that of the first embodiment. The diffractive optical element of this embodiment provides a convex lens function, as in the first embodiment, and it has an optical axis at the left-hand side of the drawing and a periodic structure of concentric circles, the period decreasing toward the peripheral portion. This embodiment differs from the first embodiment in that the representative incidence light rays 4 are incident on the diffractive optical element 1 as divergent light.

Also in this embodiment, the boundary side face 2 is inclined with an angle the same as the representative incidence angle θ12, by which production of unwanted reflection light at the boundary side face is efficiently suppressed. Thus, substantially the same advantageous effects as those of the first embodiment are attainable in this embodiment.

Embodiment 3

Figure 5:
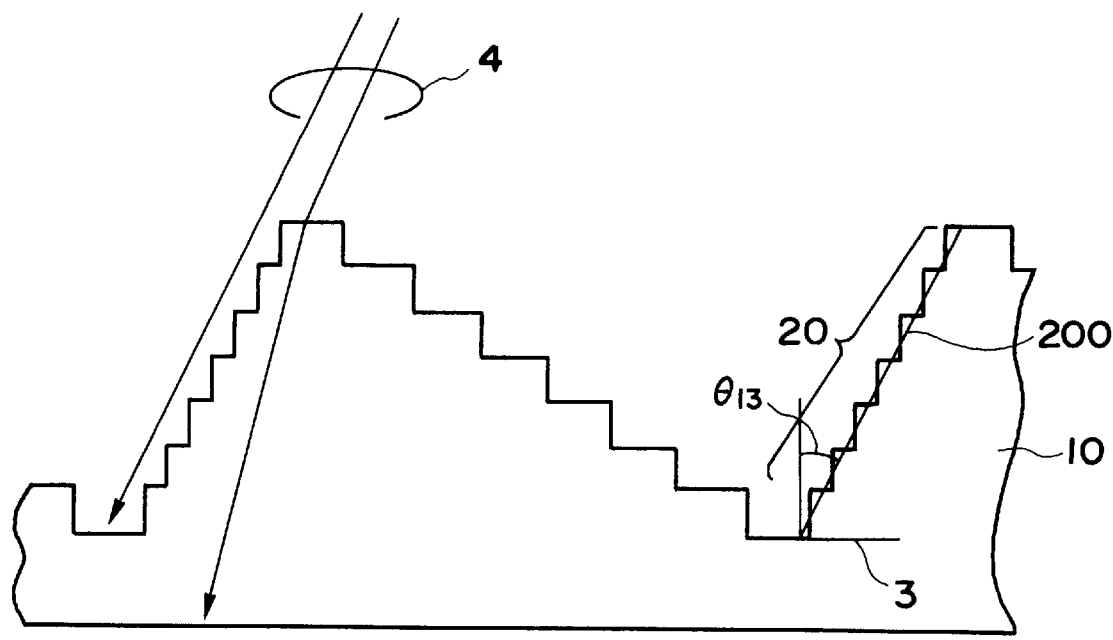
FIG. 5 is an enlarged view of a portion of a diffractive optical element according to a third embodiment of the present invention.

FIG. 5 is an enlarged sectional view of a portion of a quantized blazed type diffractive optical element according to a third embodiment of the present invention. The diffractive optical element of this embodiment provides a convex lens function, and it has an optical axis at the left-hand side of the drawing and a periodic structure with concentric circles, the period decreasing toward the peripheral portion. In the drawing, denoted at 10 is a diffractive optical element, and denoted at 20 are boundary side faces being defined by quantizing an idealistic surface 200 approximately into steps of eight levels. Denoted at 3 is a base surface which provides a reference. Denoted at 4 are representative incidence light rays which are incident at a representative incidence angle θ13. The representative incidence light rays 4 are incident on the diffractive optical element 10 as convergent light.

In this embodiment, with respect to the base surface 3, the idealistic surface 200 is inclined with an angle the same as the representative incidence angle θ13 of the representative incidence light rays 4. Since the actual boundary side faces 20 are of a step-like shape with eight levels, the projection area to the representative light rays 4 is one-eighth as compared with conventional diffractive optical elements having boundary side faces perpendicular to the base surface 3. As a consequence, also in the diffractive optical element of this embodiment, production of unwanted reflection light at the boundary side faces 20 and, thus, production of flare are effectively suppressed. Therefore, when the diffractive optical element 10 of this embodiment is incorporated into an optical system, the optical performance can be improved significantly.

Embodiment 4

Figure 6:
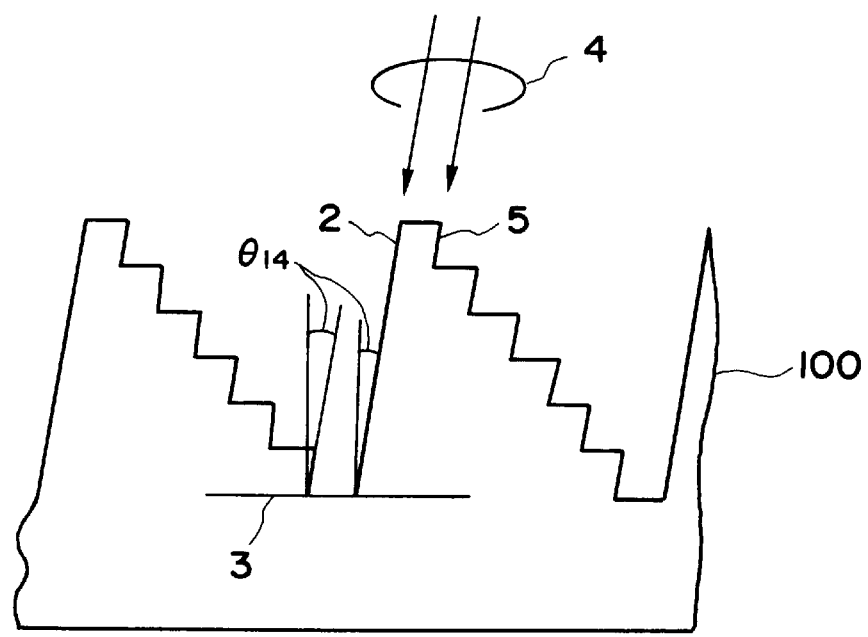
FIG. 6 is an enlarged view of a portion of a diffractive optical element according to a fourth embodiment of the present invention.

FIG. 6 is an enlarged sectional view of a portion of a quantized blazed type diffractive optical element, like that of the third embodiment. The diffractive optical element of this embodiment provides a convex lens function, and it has an optical axis at the left-hand side of the drawing and a periodic structure with concentric circles, the pitch decreasing toward the peripheral portion. Denoted in the drawing at 100 is a diffractive optical element, and denoted at 2 is a boundary side face. Denoted at 3 is a base surface which provides a reference. Denoted at 4 are representative incidence light rays which are incident with a representative incidence angle θ14. Denoted at 5 are side faces of a quantized blazed shape structure. The representative incidence light rays 4 are incident on the diffractive optical element 100 as convergent light.

In this embodiment, not only are the boundary side faces 2 inclined, but also the side faces 5 are tilted with respect to the base surface 3 with an angle the same as the representative incidence angle θ13 of the representative incidence light rays 4. With this arrangement, the projection area of the boundary side faces 2 and the side faces 5 to the representative incidence light rays 4 becomes equal to zero, and production of unwanted reflection light as well as projection of flare are effectively suppressed. Thus, when the diffractive optical element 100 of this embodiment is incorporated into an optical system, the optical performance can be improved significantly.

Embodiment 5

Figure 7:
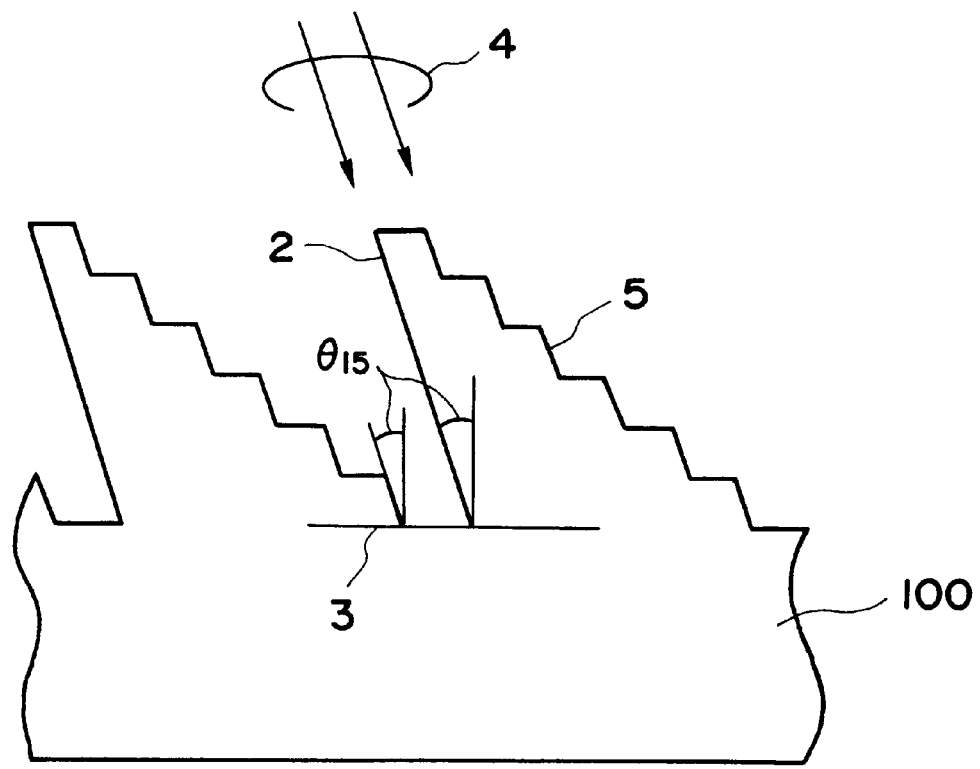
FIG. 7 is an enlarged view of a portion of a diffractive optical element according to a fifth embodiment of the present invention.

FIG. 7 is an enlarged sectional view of a portion of a quantized blazed type diffractive optical element, like that of the fourth embodiment. The diffractive optical element of this embodiment provides a convex lens function, and it has an optical axis at the left-hand side of the drawing and a periodic structure of concentric circles, the period decreasing toward the peripheral portion. This embodiment differs from the fourth embodiment in that representative light rays 4 are incident on the diffractive optical element 100 as divergent light.

Also in this embodiment, the boundary side faces 2 as well as the side faces 5 are inclined with respect to the base surface 3, with an angle the same as the representative incidence angle θ15. By this, production of unwanted reflection light at the boundary side faces 2 is effectively suppressed. Thus, substantially the same advantageous effects as those of the fourth embodiment are attainable in this embodiment.

While in the first to fifth embodiment described above, the base surface 3 has been referred to as a flat surface, it is not limited to a flat plane. A diffractive optical element may be formed on a curved surface, without damaging the advantageous effects of the present invention.

Next, examples of an optical instrument having a diffractive optical element according to the present invention will be described.

Embodiment 6

Figure 10:
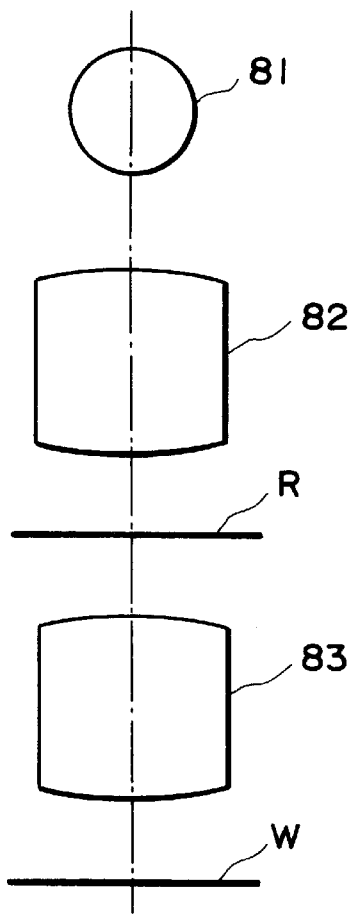
FIG. 10 is a schematic view of a main portion of an optical arrangement of an exposure apparatus in which a diffractive optical element according to the present invention is incorporated.

FIG. 10 is a schematic view of a main portion of an optical arrangement of an exposure apparatus for the manufacture of semiconductor devices, into which a diffractive optical element according to the present invention is incorporated. Denoted in the drawing at 81 is a light source, and denoted at 82 is an illumination optical system. Denoted at 83 is a projection optical system. Denoted at R is a reticle, and denoted at W is a wafer. The diffractive optical element of this embodiment can be used at various locations in the instrument, such as in the illumination optical system 82, the projection optical system 83, an alignment optical system (not shown), etc., and improved optical performance as compared with a conventional exposure apparatus is obtainable.

Embodiment 7

Figure 11:
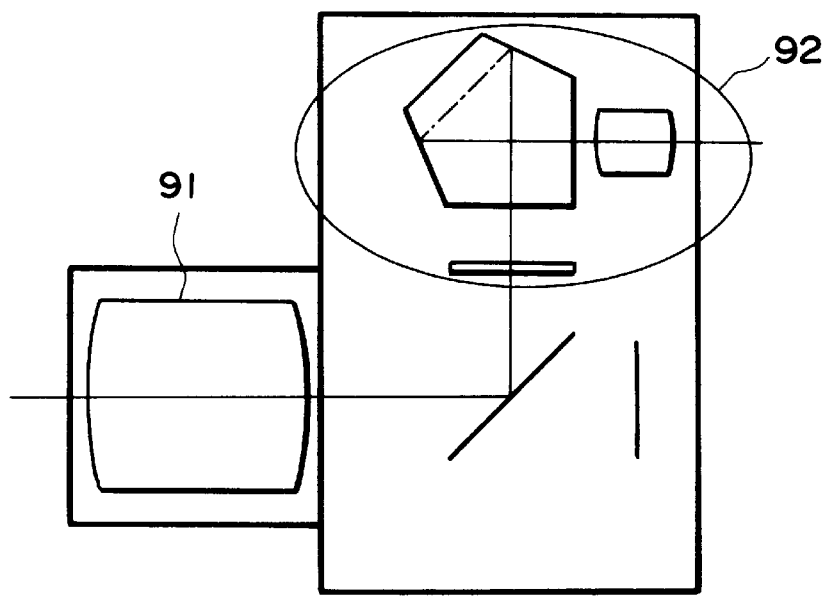
FIG. 11 is a schematic view of a main portion of an optical arrangement of a single-lens reflex camera in which a diffractive optical element of the present invention is incorporated.

FIG. 11 is a schematic view of a main portion of an optical arrangement of a single-lens reflex camera in which a diffractive optical element according to the present invention is incorporated. Denoted in the drawing at 91 is a photographic optical system, and denoted at 92 is a finder optical system. A diffractive optical element of this embodiment can be applied to an optical arrangement of a camera, as in this example, and improved optical performance as compared with a conventional camera is obtainable.

The sixth and seventh embodiments have been described with reference to examples of an optical instrument, that is, an exposure apparatus and a camera. However, the optical instrument to which the present invention is applicable is not limited to them. Within the scope of the present invention, it can be applied to various optical systems and optical instruments, with advantageous effects of improved optical performance.

With a diffractive optical element according to any of the embodiments described hereinbefore, production of flare light at discontinuous side faces of a periodic structure of a phase type diffractive optical element can be minimized, and optical performance of an optical instrument such as an exposure apparatus or a camera, for example, can be improved significantly.

Embodiment 8

Next, an embodiment of a semiconductor device manufacturing method which uses an exposure apparatus such as that of the sixth embodiment, will be described below.

Figure 12:
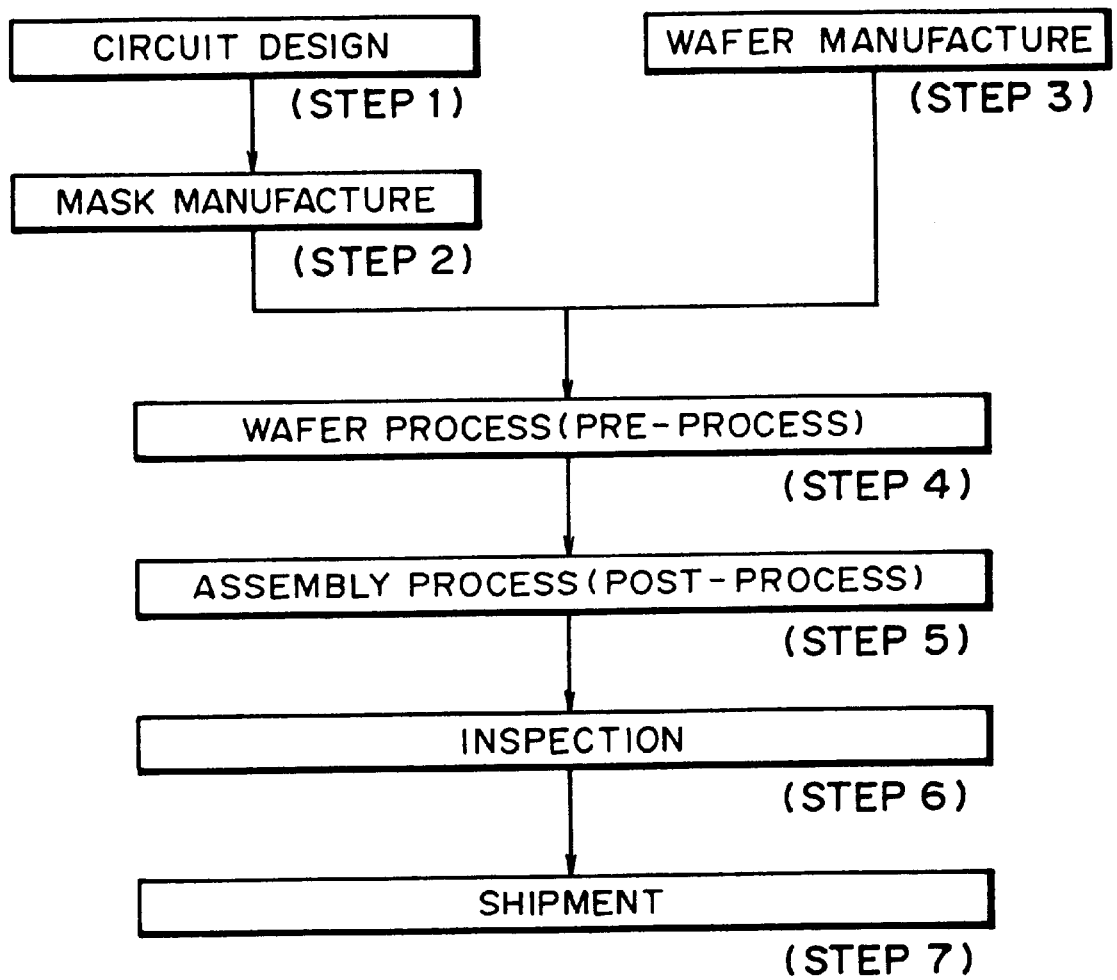
FIG. 12 is a flow chart of semiconductor device manufacturing processes.

FIG. 12 is a flow chart of a procedure for the manufacture of microdevices such as semiconductor chips (e.g., ICs or LSIs), liquid crystal panels, or CCDs, for example. Step 1 is a design process for designing a circuit of a semiconductor device. Step 2 is a process for making a mask on the basis of the circuit pattern design. Step 3 is a process for preparing a wafer by using a material such as silicon. Step 4 is a wafer process which is called a pre-process wherein, by using the so prepared mask and wafer, circuits are practically formed on the wafer through lithography. Step 5 subsequent to this is an assembling step which is called a post-process wherein the wafer having been processed by step 4 is formed into semiconductor chips. This step includes an assembling (dicing and bonding) process and a packaging (chip sealing) process. Step 6 is an inspection step wherein an operation check, a durability check and so on for the semiconductor devices provided by step 5, are carried out. With these processes, semiconductor devices are completed and they are shipped (step 7).

Figure 13:
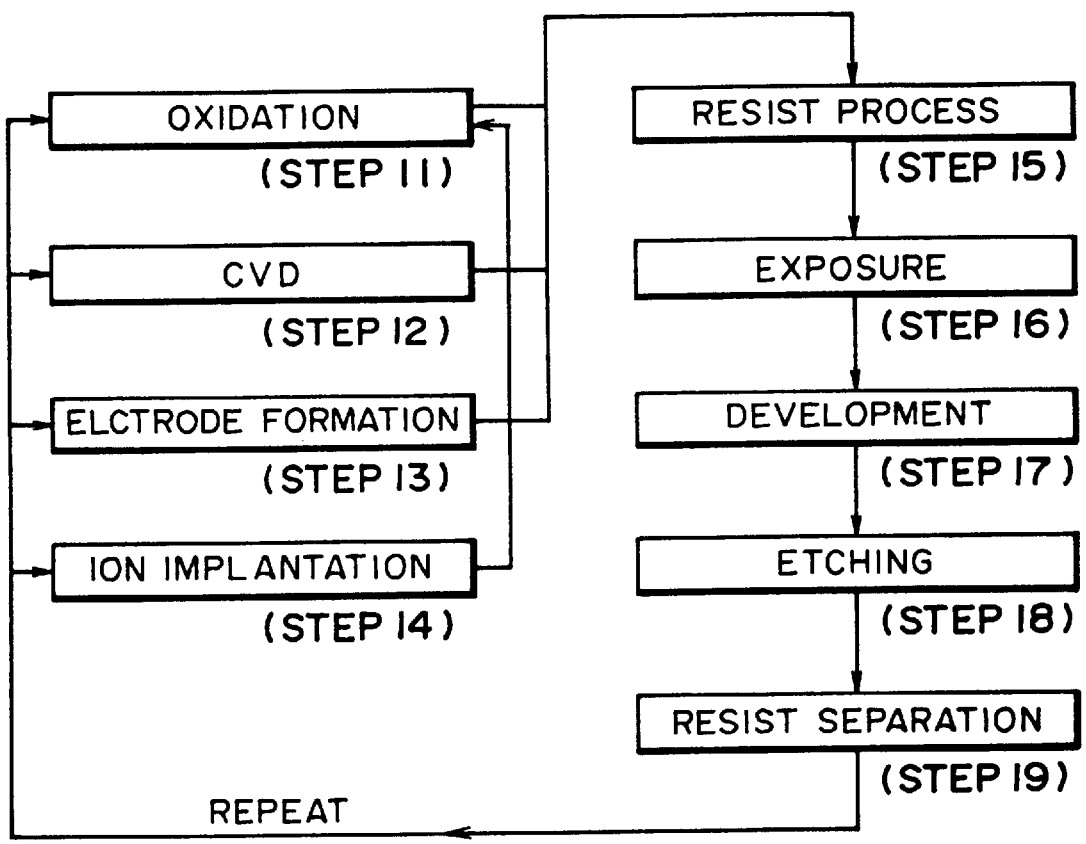
FIG. 13 is a flow chart for explaining details of a wafer process, in the procedure of FIG. 12.

FIG. 13 is a flow chart showing details of the wafer process. Step 11 is an oxidation process for oxidizing the surface of a wafer. Step 12 is a CVD process for forming an insulating film on the wafer surface. Step 13 is an electrode forming process for forming electrodes upon the wafer by vapor deposition. Step 14 is an ion implanting process for implanting ions to the wafer. Step 15 is a resist process for applying a resist (photosensitive material) to the wafer. Step 16 is an exposure process for printing, by exposure, the circuit pattern of the mask on the wafer through the exposure apparatus described above. Step 17 is a developing process for developing the exposed wafer. Step 18 is an etching process for removing portions other than the developed resist image. Step 19 is a resist separation process for separating the resist material remaining on the wafer after being subjected to the etching process. By repeating these processes, circuit patterns are superposedly formed on the wafer.

With these processes, high density microdevices can be manufactured.

While the invention has been described with reference to the structures disclosed herein, it is not confined to the details set forth and this application is intended to cover such modifications or changes as may come within the purposes of the improvements or the scope of the following claims.

What is claimed is:

1. A diffractive optical element for diffracting non-collimated light, comprising:

a base surface; and a periodic structure formed on said base surface and having a plurality of diffractive surfaces and a plurality of boundary surfaces, wherein said boundary surfaces are separated into plural zones, and in each zone the boundary surface is placed substantially parallel to a main portion of a light beam impinging on that zone.

2. A diffractive optical element according to claim 1, wherein said plural regions are defined by concentric circles.

3. A diffractive optical element according to claim 1, wherein said period structure comprises a blazed type diffraction grating.

4. A diffractive optical element according to claim 1, wherein each diffractive surface of said periodic structure has a step-like shape.

5. A diffractive optical element according to claim 4, wherein each boundary surface of said periodic structure has a step-like shape.

6. An optical instrument which includes optical means having a diffractive optical element as recited in claim 1.

7. An exposure apparatus, comprising:

illumination optical means for illuminating a mask having a pattern; and projection optical means for projecting the pattern of the mask onto a wafer, wherein at least one of said illumination optical means and said projection optical means includes a diffractive optical element as recited in claim 1.

* * * * *

UNITED STATES PATENT AND TRADEMARK OFFICE
CERTIFICATE OF CORRECTION

PATENT NO. : 6,008,942
DATED : December 28, 1999
INVENTOR(S) : MAKOTO OGUSU, ET AL.

It is certified that error appears in the above-identified patent and that said Letters Patent is hereby corrected as shown below:

SHEET NO. 8:   In the Drawing:
Figure 13, "ELCTRODE" should read --ELECTRODE--.

COLUMN 1:
Line 60, "a" should read --an--.

COLUMN 3:
Line 46, "division" should read --a division--.

COLUMN 4:
Line 57, "013." should read --θ13.--.

COLUMN 6:
Line 52, "bonding)" should read --a bonding)--.

Signed and Sealed this

Thirtieth Day of January, 2001

Attest:

Q. TODD DICKINSON

*Attesting Officer*   *Director of Patents and Trademarks*